US007947234B2

(12) United States Patent
O'Connell et al.

(10) Patent No.: US 7,947,234 B2
(45) Date of Patent: May 24, 2011

(54) LIQUID END ASSEMBLY FOR A HANDHELD MULTICHANNEL PIPETTE WITH ADJUSTABLE NOZZLE SPACING

(75) Inventors: Kenneth P. O'Connell, Walnut Creek, CA (US); Nicholas R. Vitale, Foster City, CA (US)

(73) Assignee: Rainin Instrument, LLC, Oakland, CA (US)

( * ) Notice: Subject to any disclaimer, the term of this patent is extended or adjusted under 35 U.S.C. 154(b) by 662 days.

(21) Appl. No.: 11/975,135

(22) Filed: Oct. 17, 2007

(65) Prior Publication Data

US 2009/0104079 A1 Apr. 23, 2009

(51) Int. Cl.
*B01L 3/00* (2006.01)
*G01F 1/60* (2006.01)

(52) U.S. Cl. ...................... 422/501; 422/100; 73/864.16

(58) Field of Classification Search .................. 422/100
See application file for complete search history.

(56) References Cited

U.S. PATENT DOCUMENTS

| | | | | |
|---|---|---|---|---|
| 3,855,868 | A | 12/1974 | Suovaniemi | |
| 4,779,467 | A * | 10/1988 | Rainin et al. | 73/864.17 |
| 4,830,832 | A | 5/1989 | Arpagaus | |
| 5,057,281 | A | 10/1991 | Totti | |
| 5,061,449 | A | 10/1991 | Torti | |
| 6,235,244 | B1 * | 5/2001 | Allen et al. | 422/100 |
| 2007/0092410 | A1 | 4/2007 | Ricker | |

* cited by examiner

*Primary Examiner* — Sam P Siefke
*Assistant Examiner* — Bryan T Kilpatrick
(74) *Attorney, Agent, or Firm* — Clarke A. Wixon

(57) ABSTRACT

A handheld multichannel pipette includes multiple fluid-handling nozzles and a rotary adjustment mechanism for adjusting the width of a pattern of nozzles while maintaining equal spacing between pairs of nozzles. Embodiments of the adjustable-spacing multichannel pipette include an adjustable stop mechanism.

20 Claims, 11 Drawing Sheets

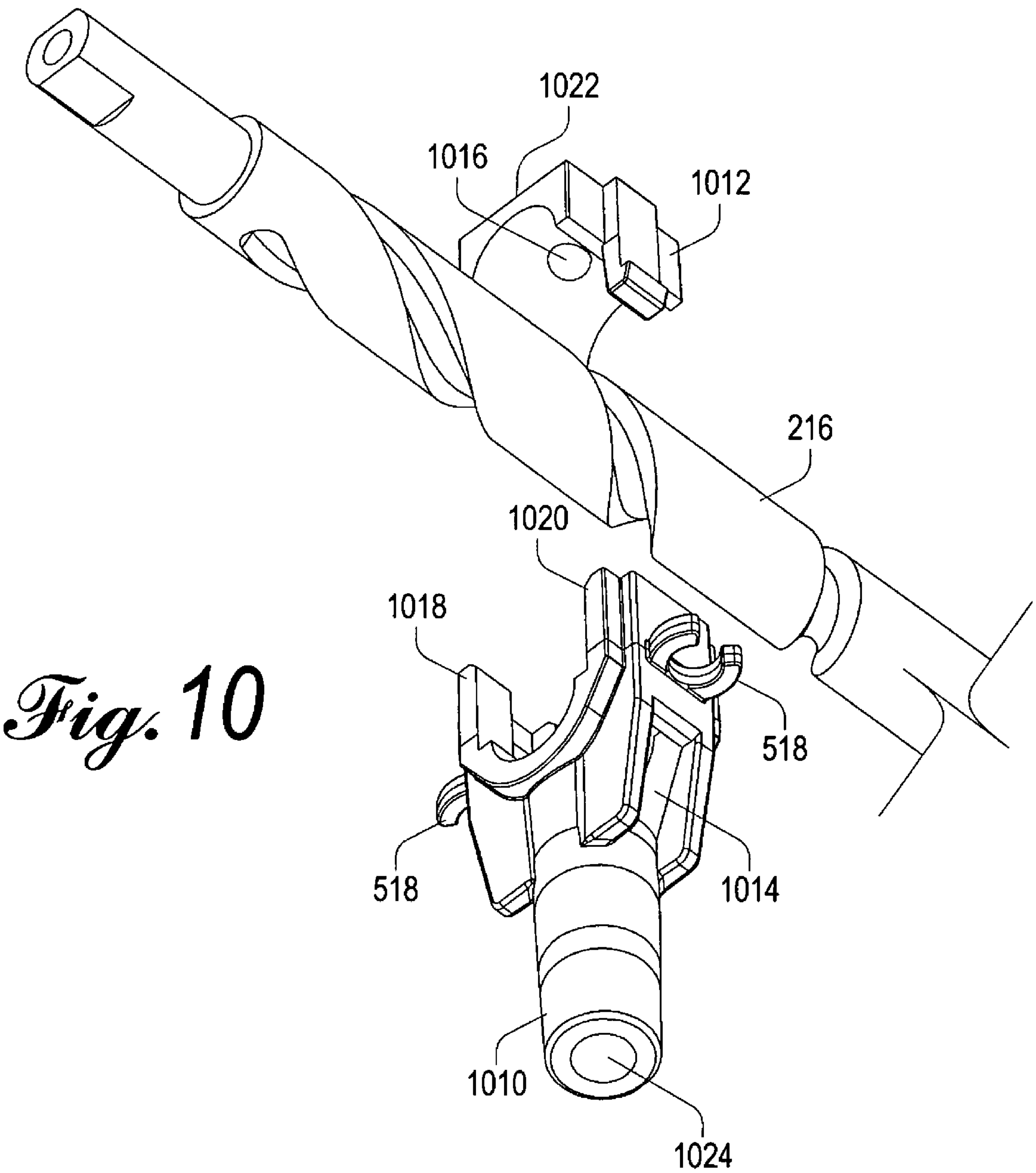
*Fig.* 10

*Fig.* 11
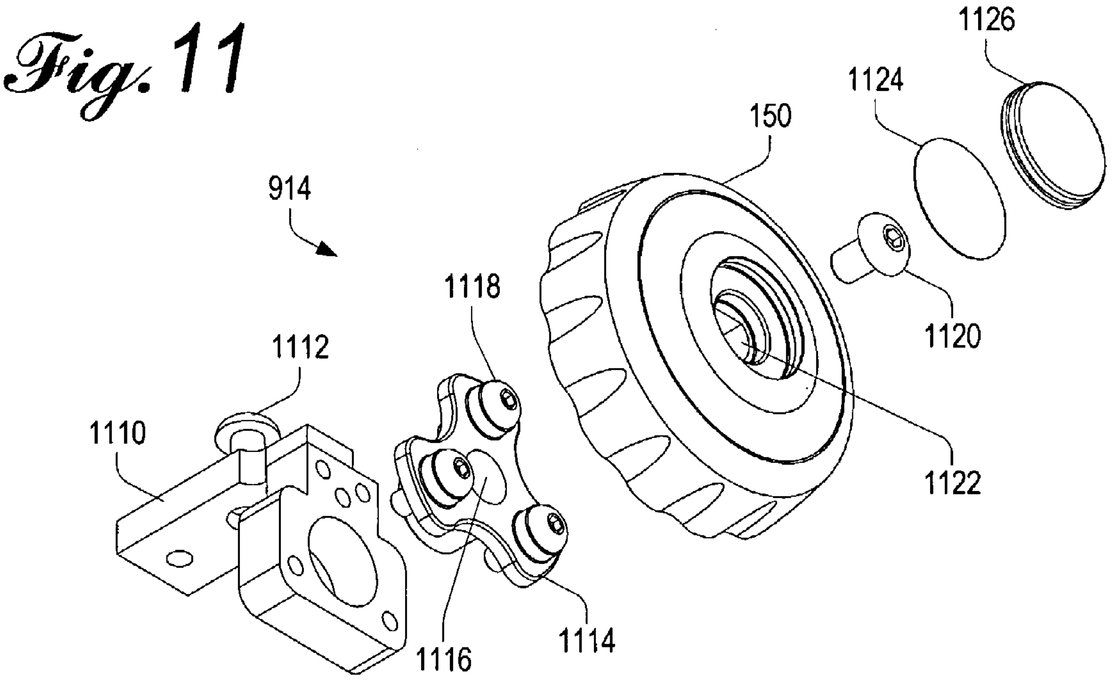
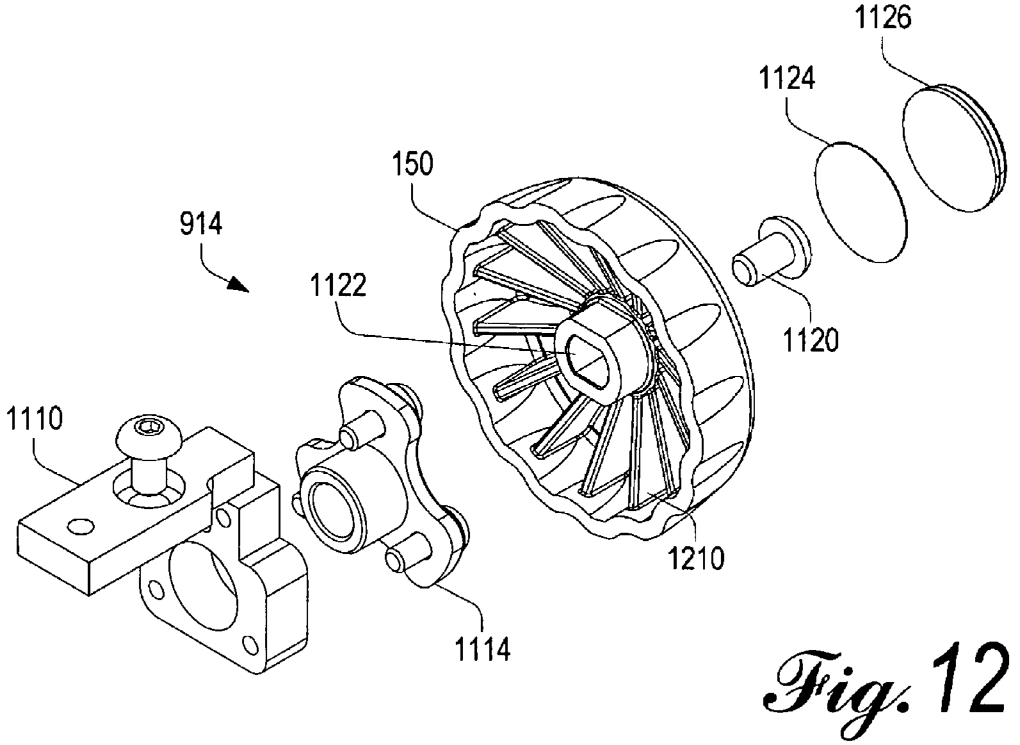
*Fig.* 12

*Fig.* 13
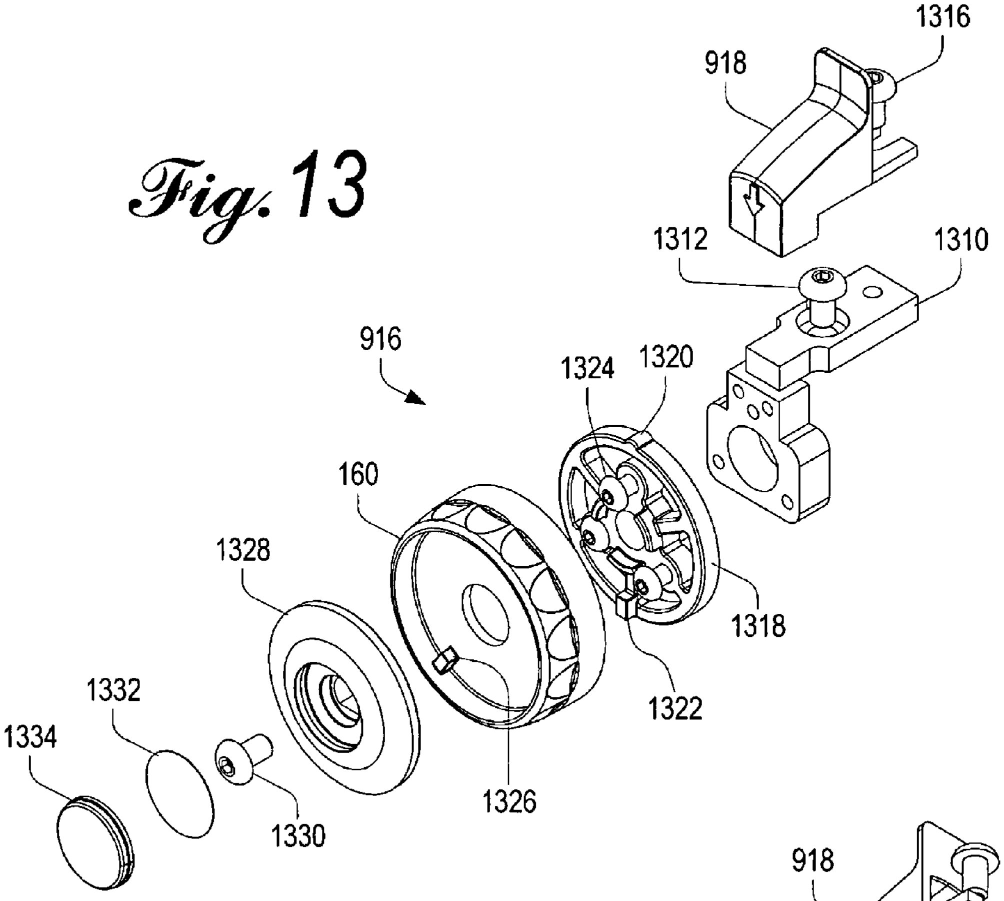
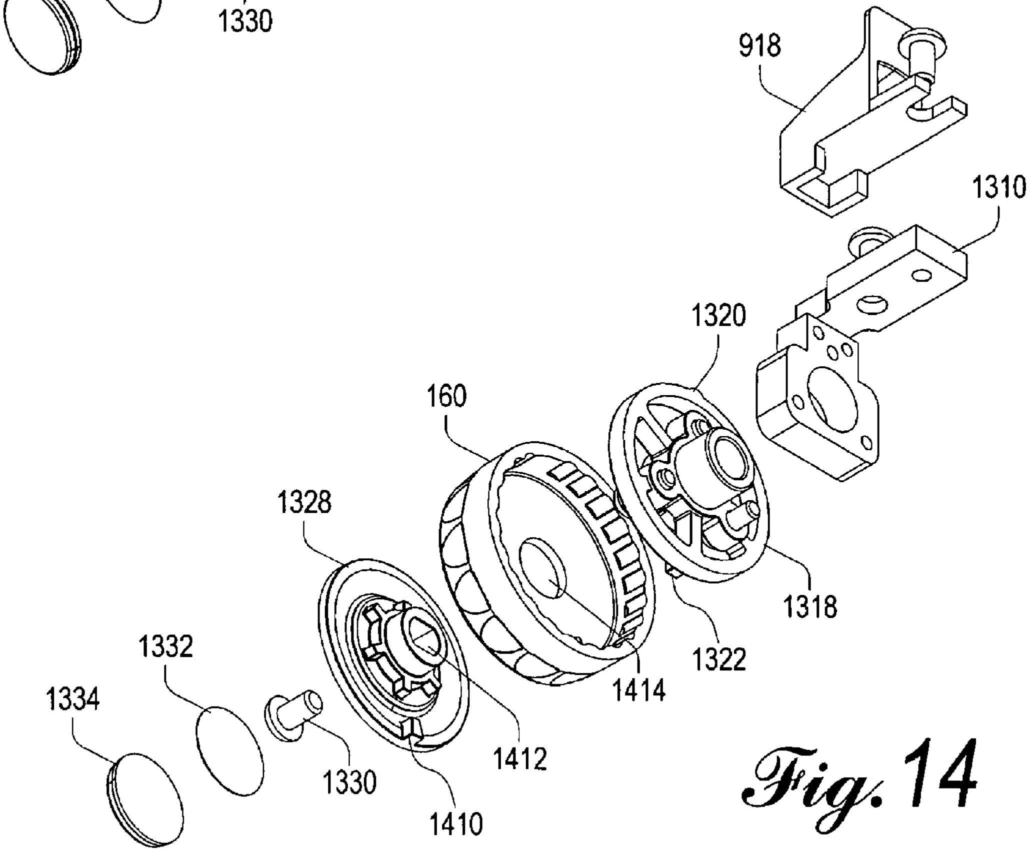
*Fig.* 14

LIQUID END ASSEMBLY FOR A HANDHELD MULTICHANNEL PIPETTE WITH ADJUSTABLE NOZZLE SPACING

BACKGROUND OF THE INVENTION

The invention relates to multichannel pipettes for drawing volumes of liquid and subsequently discharging precise volumes of the drawn liquid. More particularly, the invention relates to multichannel air-displacement pipettes in which disposable tips typically contain the drawn liquid, and an air buffer separates the drawn liquid from multiple piston and cylinder structures typically utilized for drawing and discharging the liquid, so as to prevent contamination of the primary operational elements of the pipette. Specifically, the invention is directed to a multichannel liquid-end assembly for an air-displacement pipette, wherein the spacing between nozzles in the liquid end assembly is easily adjusted by a rotary mechanism.

Traditional multichannel pipettes have been available for decades, and have permitted users to transfer fluid samples from one set of receptacles to another. Generally, such pipettes have multiple nozzles arranged in one or two evenly-spaced rows, and the nozzles are configured to receive disposable pipette tips similar or identical to tips used on single-channel handheld pipettes.

Most traditional handheld multichannel pipettes have their nozzles arranged at a fixed 9 mm pitch. For example, Rainin Instrument, LLC, offers multichannel pipettes in eight-channel (one row of eight nozzles), twelve-channel (one row of twelve nozzles), sixteen-channel (two rows of eight nozzles), and twenty-four-channel (two rows of twelve nozzles) configurations. Other companies offer multichannel pipettes with nozzles arranged at a fixed 4.5 mm pitch, allowing access to microplates.

However, it will be noted that this fixed nozzle configuration can be limiting in some ways. For example, the liquid sample source and destination must have the same pitch. It is not possible with a fixed 9 mm multichannel pipette to transfer liquid directly from a 96-well plate to a rack of test tubes that are spaced wider than 9 mm apart. And with a standard 9 mm multichannel pipette, the user cannot transfer between two sets of test tubes at all, unless alternating channels are disabled (e.g., by not mounting tips thereto). In the latter case, performance may be impaired, as the unused nozzles may get in the way.

Attempts have been made to address these shortcomings.

U.S. Pat. No. 5,057,281 ("the '281 patent") assigned to Matrix Technologies Corporation discloses a handheld multichannel pipette with each nozzle being individually adjustable along a slotted plate. This allows for unequal spacing between adjacent nozzles, but has the disadvantage of requiring each individual nozzle to be manually positioned and locked into place each time a change of spacing is desired. This is a slow and meticulous operation; it can lead to inefficiencies in pipetting operations.

U.S. Pat. No. 5,061,449 ("the '449 patent") discloses a nozzle adjustment mechanism that is available in the EXP line of handheld pipettes from Matrix Technologies Corporation. This pipette allows all nozzles to be adjusted using a single mechanism, which is actuated by a slidable actuating rod extending from one side of the housing of the pipette. The rod is pushed in to move the nozzles into their most-retracted configuration, or pulled out to move the nozzles into their most-extended configuration. The nozzles all ride upon a slotted plate, and a flexible yet relatively inelastic strap connects adjacent nozzles. Accordingly, when the nozzles are pushed together, the flexible strap is able to fold up upon itself and avoid obstructing adjacent nozzles, and the nozzles are able to be situated against one another in a uniform narrow spacing. Similarly, when the nozzles are pulled apart, the strap unfolds to a constant length between nozzles, and a uniform wide spacing is accomplished.

It will be noted that this configuration has some drawbacks. Only fully-retracted and fully-extended positions will guarantee uniform spacing. Intermediate positions may be inconsistently spaced. In such cases, the nozzles may "bunch up"—some of the straps between nozzles may have unfolded, while others may remain fully or partially folded. Moreover, the actuating rod that extends from a side of the pipette's housing may limit the ability of the pipette to be used in confined spaces. To move the nozzles from fully-retracted to fully-extended, a rod extension of several centimeters may be necessary, and while the nozzles remain extended, the rod will remain several centimeters out of the housing.

U.S. Pat. No. 6,235,244 ("the '244 patent") discloses a pantographic linkage used to maintain equal spacing between nozzles. This configuration is used in the commercially available Equalizer line of pipettes from Matrix Technologies Corporation. As with the '449 patent, the nozzles slide along a slotted plate, and are driven by an actuating rod that extends from the side of the pipette. As noted above, equal nozzle spacing is maintained using the pantographic linkage, and an additional feature of a stop slidably mounted on the housing is provided. The stop allows a maximum spacing to be set and that position repeatedly accessed by sliding the actuation rod until the stop is felt. For the reasons set forth above, the linear actuation rod is not ideal, in that it may prevent the use of the pipette in confined spaces. Moreover, it may be subject to accidental movement simply by tapping the end of the rod inadvertently against any surface.

U.S. Pat. No. 4,830,832 ("the '832 patent") discloses a rotary mechanism for uniformly moving pipette nozzles between a retracted position and an expanded position. Nozzles slide along a guide rail, and are driven by a rotating grooved cam. Each nozzle tracks a groove in the cam. The '832 patent is directed to a robotic liquid handling apparatus, however, and does not illustrate how its concepts may be employed in a handheld device.

Clearly, a need exists for an adjustable multichannel pipette that avoids the limitations of the prior art. Such a pipette would include advantageous features, such as a compact design, equal spacing, and adjustable stop mechanisms, while avoiding deficiencies such as the extending adjustment rod that takes up unnecessary space and may be inadvertently moved. Such a pipette would be easy to use and facilitate repeatable adjustments, to move between sample plates and tubes, and to easily adapt to fit the 9 mm spacing used in disposable tip racks.

SUMMARY OF THE INVENTION

The multichannel liquid end disclosed herein matches the capability of known commercial adjustable spacing pipettes, but with several additional advantages. Nozzle spacing is adjustable, and uniform spacing is maintained as the nozzles are adjusted between a fully-retracted configuration and a fully-expanded configuration. However, a rotatable spacing adjustment knob is employed to make the adjustment, rather than a push-pull adjustment rod as employed in several of the references set forth above. In a liquid end according to the invention, the nozzle spacing adjustment mechanism employs a rotating grooved cam and nozzles that track the grooves; a guide rail prevents undesired rotation of the nozzles along with the cam. This configuration is similar to that set forth in the '832 patent, but adapted for advantageous and convenient use in a handheld pipette.

A pipette according to the invention permits easy access to standard 96-well sample plates, as well as standard 48-well and 24-well plates. Spacing can be adjusted between the traditional 9 mm spacing used in pipette tip refill packages and any other desired spacing within the pipette's range of operation.

With a pipette according to the invention, it is simple to transfer samples between multi-well plates and racks of test tubes having spacing of 14.5 mm or more from center to center. An adjustable multichannel pipette according to the invention may also accomplish gel loading at any desired pitch. An embodiment of the invention is adjustable down to 4.5 mm centers, allowing access to 384-well microplates as well as the containers discussed above.

Because of the simple, easy-to-use, adjustment knob, a pipette using a liquid end as described herein is easy to operate, does not take unnecessary lateral space, and may be used in confined environments. The lack of an exposed adjustment rod avoids accidental movement away from the desired nozzle spacing when the pipette is inadvertently touched against a surface, as may happen from time to time in ordinary laboratory operations.

An embodiment of a liquid end according to the invention includes a housing having an opening in a top wall for receiving a plunger shaft connectable to a drive mechanism of the pipette for axial movement in the housing. The plunger shaft is preferably adaptable to different kinds of pipette bodies, including both manual and electronic versions.

As with traditional handheld multichannel pipettes, a plurality of cylinders is mounted within the housing, each of which receives an air displacement piston mounted for axial movement therein in response to movement of the plunger shaft. Each of the cylinders is coupled to a nozzle with an open end extending from the bottom wall of the housing. As in traditional pipettes, the nozzles are used to mount and release disposable pipette tips.

To provide the advantages described herein, the liquid end also includes a spacing adjustment mechanism configured to be manipulated by a user and to cause a rotating cam to move the nozzles between multiple spacings, with uniform nozzle-to-nozzle spacing maintained at all times. This mechanism is operated via a spacing adjustment knob, which protrudes very little from the side of the housing of the liquid end. Various embodiments also include stop mechanisms to ensure a desired maximum nozzle spacing is not exceeded, or to allow a desired setting to be reached very easily by noting the tactile resistance offered by the stop mechanism.

BRIEF DESCRIPTION OF THE DRAWINGS

These and other objects, features, and advantages of the invention will become apparent from the detailed description below and the accompanying drawings, in which:

FIG. 10 is an exploded view of a single nozzle and a portion of a nozzle spacing cam according to an embodiment of the invention;

FIG. 11 is an exploded view of a nozzle spacing adjustment knob assembly according to an embodiment of the invention;

FIG. 12 is an exploded view of the nozzle spacing knob assembly of FIG. 11 viewed from a different orientation;

FIG. 13 is an exploded view of a stop knob assembly according to an embodiment of the invention;

FIG. 14 is an exploded view of the stop knob assembly of FIG. 13 viewed from a different orientation;

DETAILED DESCRIPTION OF THE INVENTION

The invention is described below, with reference to detailed illustrative embodiments. It will be apparent that a system according to the invention may be embodied in a wide variety of forms. Consequently, the specific structural and functional details disclosed herein are representative and do not limit the scope of the invention.

Figure 1:
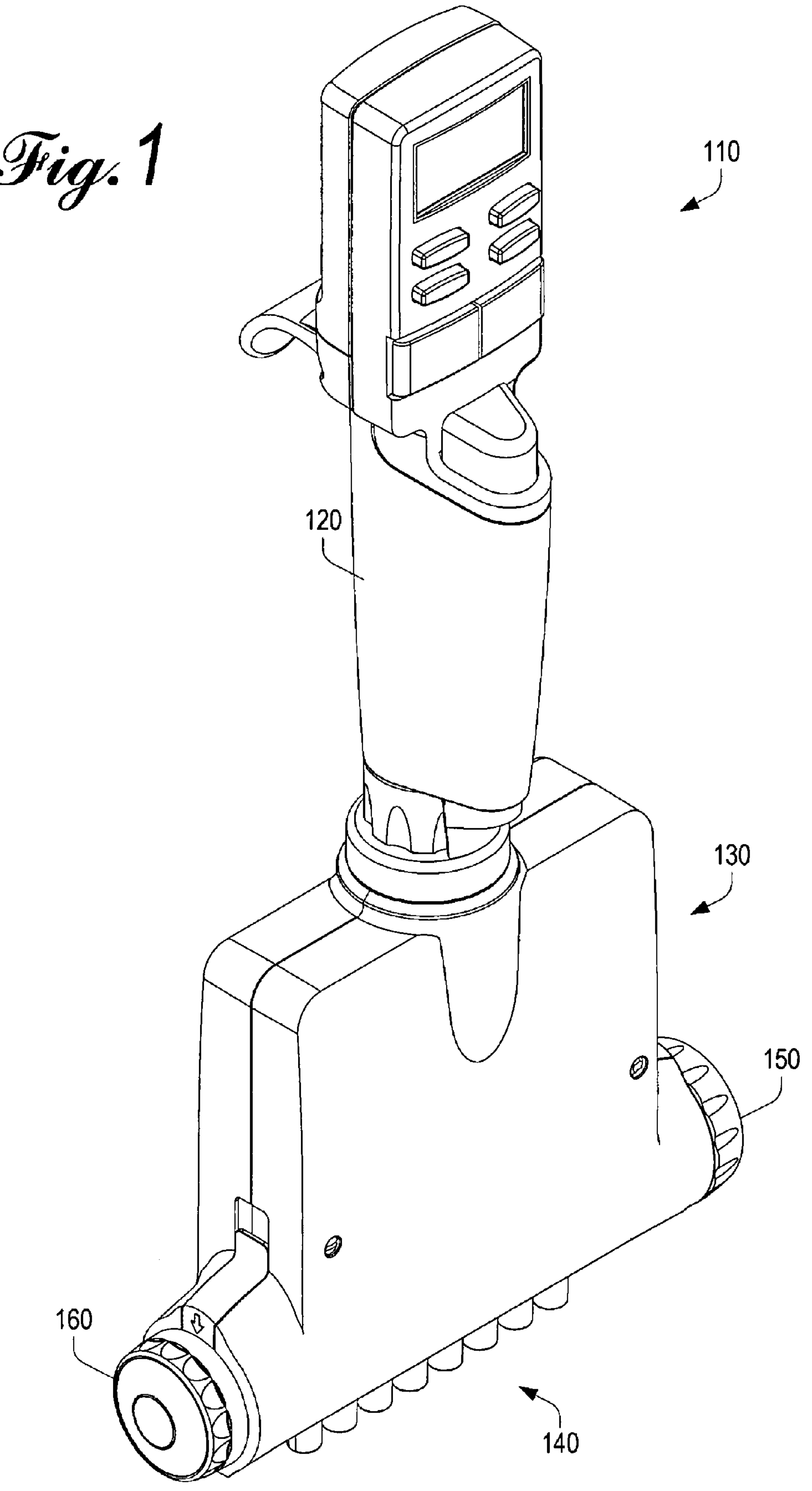
FIG. 1 is an overall view of a handheld electronic pipette having a liquid end with variable nozzle spacing according to an embodiment of the invention.

Referring initially to FIG. 1, an electronic pipette 110 similar to one from the EDP3-Plus line of pipettes from Rainin Instrument, LLC, is illustrated. The pipette 110 includes a hand-holdable body 120 which contains a drive mechanism that acts axially within the body. In the illustrated pipette 110, a motor drives a shaft up and down within the body 120, and this movement is transferred to a liquid end assembly 130.

Although FIG. 1 illustrates an electronic pipette, it will be recognized that manually-driven pipettes may also be used. In such cases, pressure upon a plunger button will drive a shaft up and down and the same movements will be transferred to the liquid end assembly 130.

As illustrated, the liquid end assembly 130 includes eight nozzles 140 arranged in an array. As described above, pipettes having eight or twelve nozzles in a single row (in a fixed configuration) are currently available; an embodiment with six nozzles will be described in further detail below.

The liquid end assembly 130 is provided with a spacing adjustment knob 150. By turning the spacing adjustment knob 150, a user of the pipette 110 may move the nozzles 140 between a retracted position and an extended position, and any desired position between. In all cases, the spacing between adjacent pairs of nozzles is kept uniform.

The illustrated pipette 110 further includes a stop knob 160, by which the user may select a maximum spacing for the nozzles 140. When the desired spacing is reached, attempts to turn the spacing adjustment knob 150 will encounter resistance. Accordingly, with the stop knob 160 set, it is simple to move the nozzles 140 between their retracted position (typically 9 mm from center to center, though alternative embodiments may employ different minimum spacings) and the desired setting. In an embodiment of the invention, the stop knob 160 is provided with detents to allow relatively precise stop settings that are not susceptible to drifting, and to further allow the user to override the stop setting by more forcefully turning the spacing adjustment knob 150.

Figure 2:
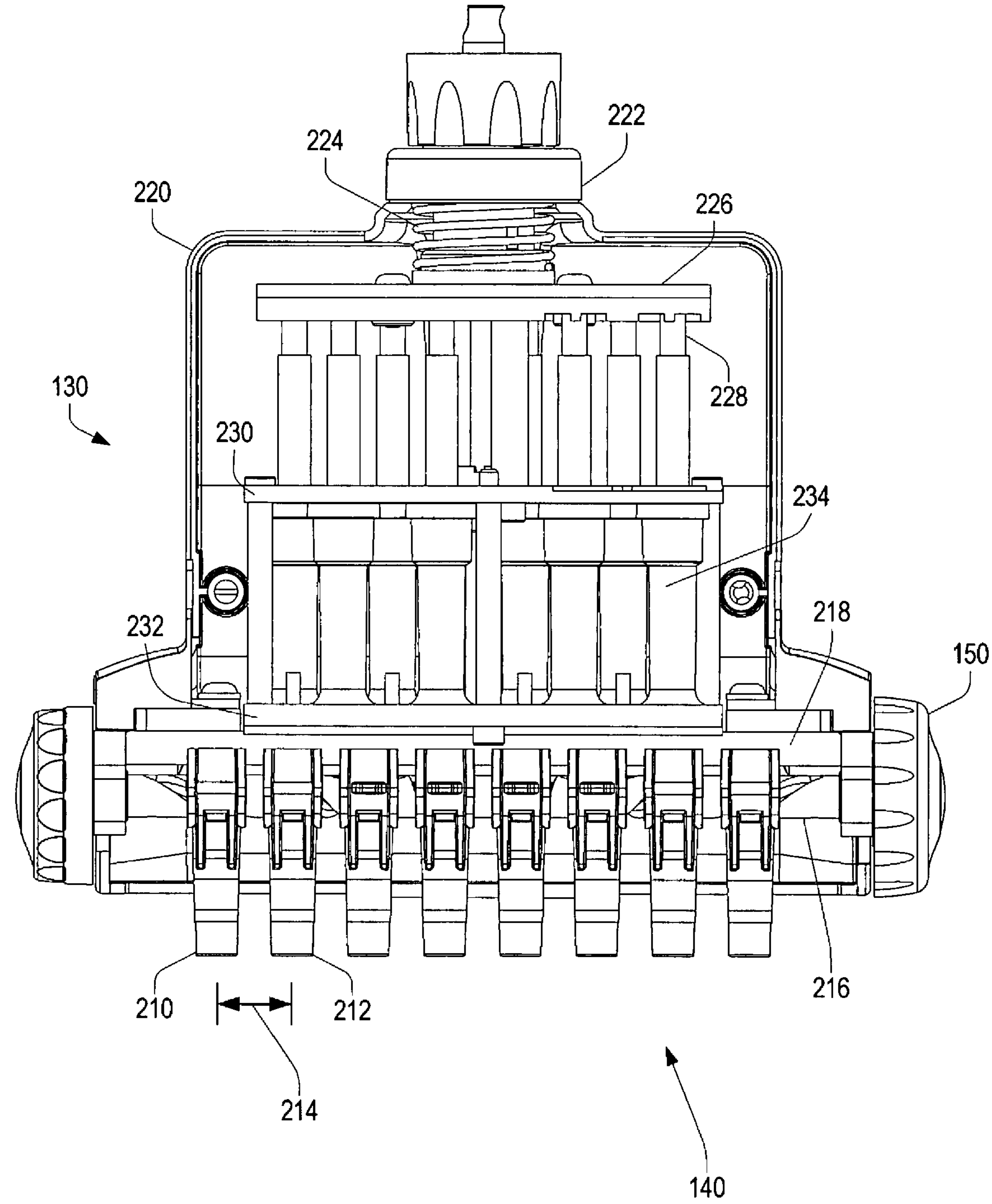
FIG. 2 is an internal view of a liquid end with variable nozzle spacing according to an embodiment of the invention.

FIG. 2 illustrates the interior of a liquid end according to the invention. As illustrated, a first nozzle 210 is separated from a second nozzle 212 by a distance represented by an interval 214, which extends from the center of the first nozzle 210 to the center of the second nozzle 212. Each of the nozzles 140 is coupled to a rotatable nozzle spacing cam 216 and a solid nozzle rail 218, both of which extend laterally across the bottom of a housing 220 for the liquid end assembly 130. As will be discussed in further detail below, rotating the nozzle spacing cam 216 (which is accomplished by turning the spacing adjustment knob 150) causes the nozzles 140 to slide along the rail 218 between retracted and extended configurations.

It will be noted that the liquid end housing 220 essentially floats over the mechanism inside the liquid end assembly 130. To be specific, the liquid end housing 220 is coupled to an ejection collar 222, and both the housing and the collar are urged upward (toward the pipette body 120) by an ejection spring 224. The liquid end housing 220 surrounds the nozzles 140 closely enough that by exerting downward pressure on the ejection collar 222 and the housing 220, the bottom of the housing 220 will act against any tips installed on the nozzles 140 and eject them. Generally, both electronic and manual pipettes are equipped with ejection buttons operative to transfer force to the ejection collar 222, which acts against the ejection spring 224 allowing the housing 220 to move downward and eject the tips.

Also illustrated in FIG. 2 is a piston plate 226, which is located near the proximal end of the liquid end assembly 130. The piston plate 226 is movable by the pipette 110 (either under human power in a manual pipette or via motor in an electronic pipette), up and down within the liquid end assembly 130, which is axially with respect to the pipette body 120.

A cylinder plate 230 and a manifold 232 are fixed in position with respect to the liquid end assembly 130. The cylinder plate 230 defines a plurality of openings to receive a plurality of pistons (including the piston 228) which extend through air-tight seals into a corresponding plurality of cylinders (including the cylinder 234) situated between the cylinder plate 230 and the manifold 232.

Alternatively, instead of a stationary air-tight seal between the cylinder 234 and the piston 228 through which the smooth and cylindrical piston 228 moves, a seal may be coupled to and move with the piston 228 (which may be of any reasonable shape) and maintain an air-tight seal against a smooth inner wall of the cylinder 234. In both cases, the quantity of air displaced by the piston 228 is linear and proportional to the position of the piston 228 within the cylinder 234.

Movement of the piston plate 226 causes the plurality of pistons (including the piston 228) to move and displace an equal amount of air within each of the corresponding plurality of cylinders (including the cylinder 234), as is common in multichannel air displacement pipettes. The axial movement of the piston plate 226 must be extremely stable, and the piston plate 226 must remain parallel to the cylinder plate to a high degree of accuracy in order to ensure accurate fluid measurement in a pipette 110 according to the invention. Details of the air flow will be described in further detail below with reference to FIG. 5.

In the disclosed embodiment, the piston plate 226, the cylinder plate 230, and the manifold 232 are all fabricated primarily from aluminum. The pistons are polished stainless steel, and the cylinders are molded or machined from VALOX polybutylene terephthalate (PBT) from GE Plastics, though in all cases materials with similar properties, or dissimilar materials providing adequate performance (especially strength, thermal stability, and resistance to chemicals), may be substituted. In particular, different materials and specific configurations may be used for pipettes having different liquid capacities. The illustrated pipette has a capacity of 300 microliters (per channel); larger or smaller capacities may require some changes, but are still considered to be within the scope of the present invention.

Figure 3:
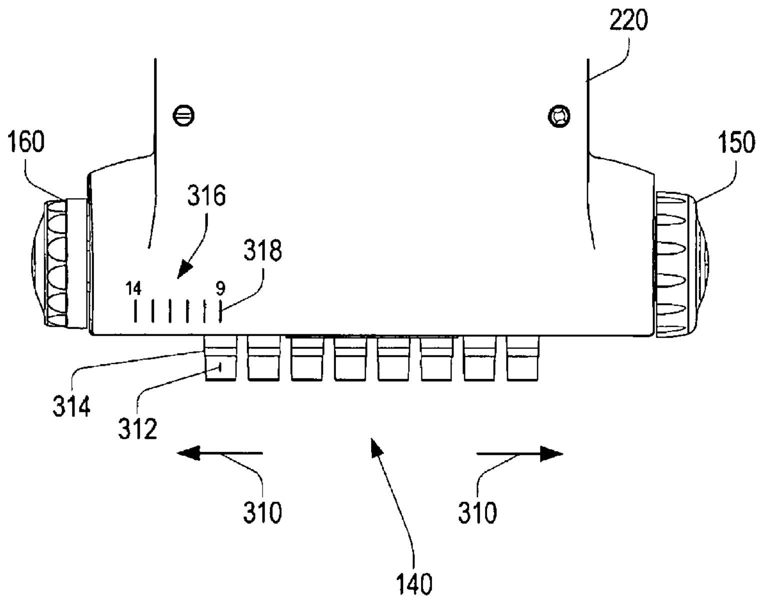
FIG. 3 is a view of the distal end of a liquid end with variable nozzle spacing according to an embodiment of the invention, with nozzles shown at their most-retracted configuration.
Figure 4:
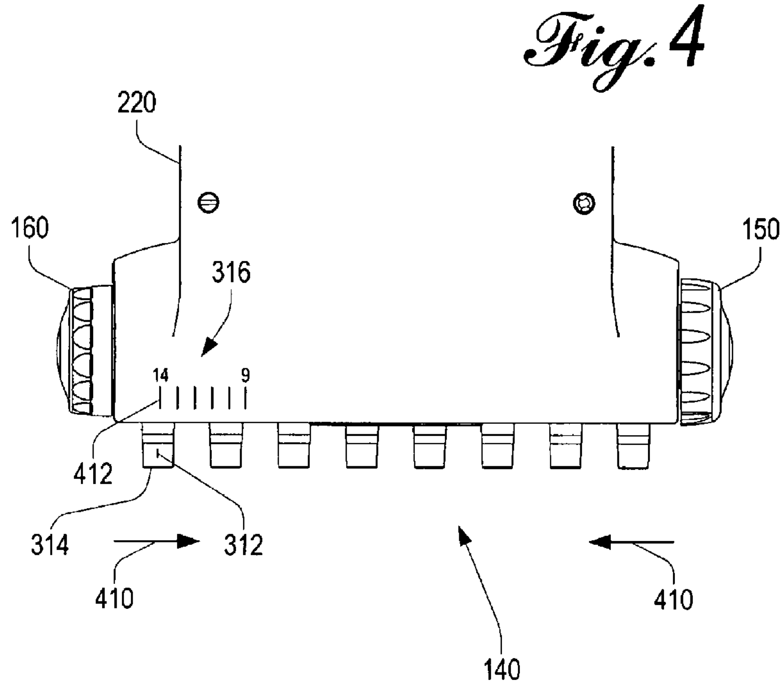
FIG. 4 is a view of the distal end of a liquid end with variable nozzle spacing according to an embodiment of the invention, with nozzles shown at their most-expanded configuration.

Referring now to FIGS. 3 and 4, the operations performed to adjust nozzle spacing will be illustrated.

FIG. 3 depicts a liquid end assembly 130 with nozzles 140 in their most retracted configuration. To expand the nozzles 140 (as illustrated by the arrows 310), the user turns the spacing adjustment knob 150 in a counter-clockwise direction, as far as necessary, or until resistance is encountered indicating that either the maximum expansion has been reached or a stop set by the stop knob 160 has been encountered.

It will be noted that a registration mark 312 provided on a first nozzle 314 provides an indication of nozzle spacing with reference to a scale 316 marked on the housing 220 of the liquid end assembly 130. Specifically, as shown in FIG. 3, the registration mark 312 aligns with a hash mark 318 indicating 9 mm spacing. Accordingly, at the narrowest and most retracted position, the nozzles 140 are 9 mm apart, from center to center.

FIG. 4 depicts a liquid end assembly 130 with nozzles 140 in their most expanded configuration. To retract the nozzles 140 (as illustrated by the arrows 410), the user turns the spacing adjustment knob 150 in a clockwise direction as far as necessary, or until resistance is encountered indicating maximum retraction has been reached.

In FIG. 4, the registration mark 312 on the first nozzle 314 is slightly past a hash mark 412 on the scale 316 indicating a spacing of 14 mm from center to center. Accordingly, based on that visual representation, the user knows that the nozzles 140 are at or near their maximum spacing of about 14.5 mm.

Figure 5:
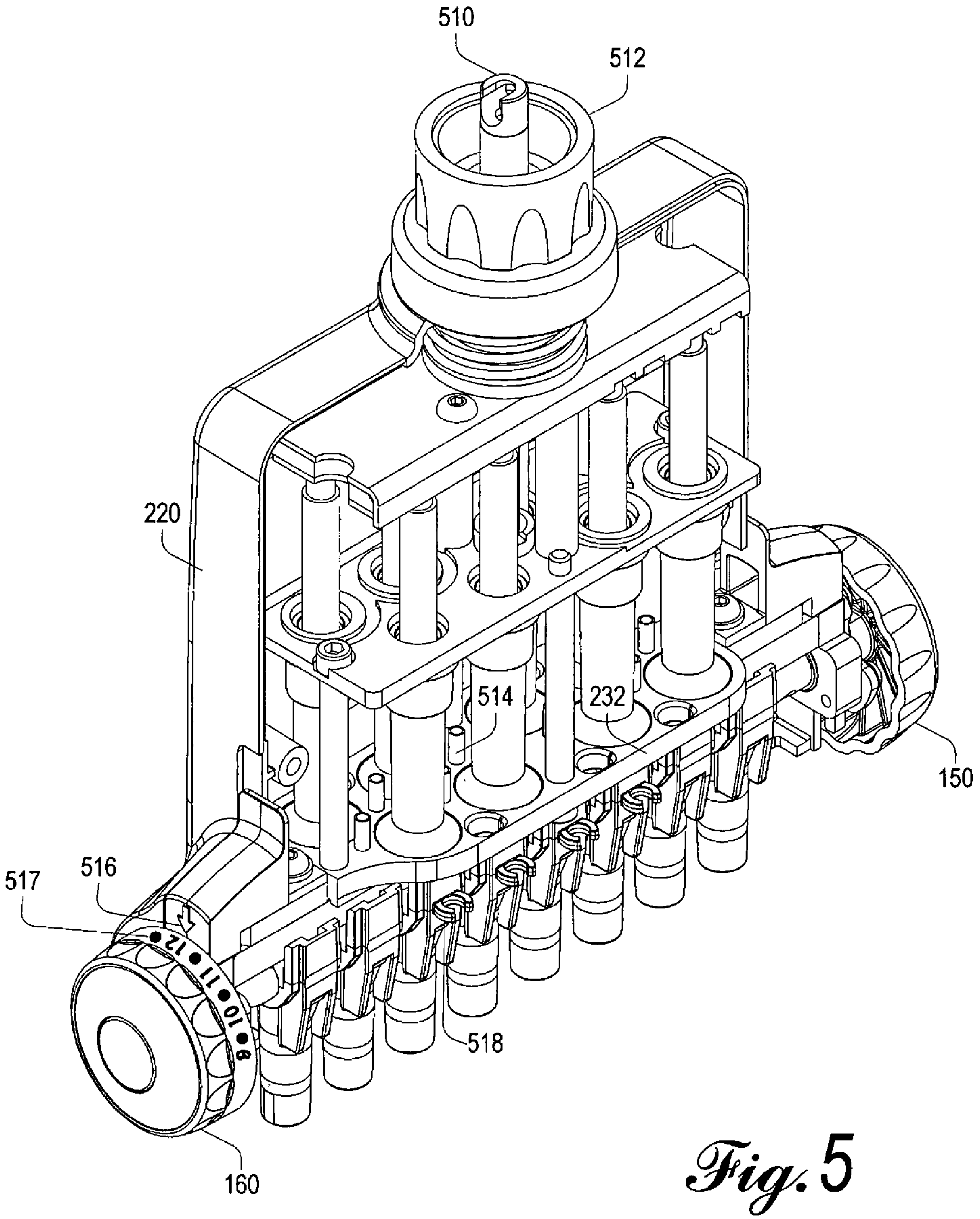
FIG. 5 is an isometric view of the interior of a liquid end with variable nozzle spacing according to an embodiment of the invention.

FIG. 5 illustrates additional aspects of the liquid end assembly 130. At the outset, it will be noted that a plunger shaft 510 is exposed at an upper end of the liquid end assembly 130. As illustrated, the plunger shaft 510 forms part of a ball-and-socket joint with an adjoining shaft in the pipette body 120; specifically, a proximal end of the plunger shaft 510 is shaped as a socket accessible from the side. This configuration is advantageous, in that a relatively rigid straight linkage is obtained between the plunger shaft 510 and the drive mechanism in the pipette body 120, but the linkage may be easily disassembled simply by moving the joint to an angle. Ordinarily, a coupling nut 512 connects the liquid end assembly 130 to the pipette body 120, preventing the joint from assuming any angle other than substantially straight. But with the coupling nut 512 disengaged, it is a simple operation to remove the liquid end assembly 130 from the pipette 110, or to reconnect the liquid end assembly 130 to a pipette body 120. It is a further advantage that the ball-and-socket joint used by the plunger shaft 510 may be rotated 360 degrees, allowing the nozzles to be oriented at any radial angle with respect to the axis of the pipette body.

The illustrated plunger shaft 510, in ball-and-socket form, is generally used with electronic pipettes that use an electric motor to move the shaft 510 upward and downward as necessary. However, a manual pipette may use a different joint, with a cupped receptacle at the proximal end of the plunger shaft 510 and a rounded adjoining shaft in the pipette body. In the latter case, a spring urges the plunger shaft upward and toward the pipette body, which keeps the plunger shaft 510 and the pipette body shaft closely coupled. This joint may be disassembled simply by loosening the coupling nut 512 and pulling the shafts apart.

Although the disclosed pipette 110 employs an external spacing adjustment knob manipulated by a user to change the spacing of the nozzles 140, it is also considered within the scope of the invention to include an automated motorized drive for the cam 216, either exclusively or in addition to a manual knob to override the automatic movement.

The manifold 232, in addition to the cylinders described with reference to FIG. 2, also includes a plurality of air fittings (such as the air fitting 514), each of which is associated with one of the cylinders. Movement of the pistons within the cylinders causes air to move through the air fittings; an air path between the cylinders and the air fittings is described below and illustrated in FIGS. 7-8. In the disclosed embodiment, the air fittings are stainless steel tubes inserted into openings in the manifold 232 and glued in place. Preferably, the openings define a shelf structure to facilitate uniform insertion depth for the air fittings in the manifold 232.

Also visible in FIG. 5 is an arrow 516 formed as part of the housing 220 (but part that does not move along with the housing 220 as ejection forces are applied to the ejection collar 222). The arrow 516 may align with registration marks 517 on the stop knob 160, if provided, that will indicate where the stop is located. For example, if a maximum nozzle spacing of 12 mm is desired, a user may turn the stop knob 160 until the arrow 516 aligns with a marked indication on the stop knob 160 reading "12," as illustrated. The operation of the stop knob 160 and the stop mechanism associated therewith will be discussed in further detail below.

It will be noted that certain of the nozzles 140 include tube clips, such as the tube clip 518 illustrated. As will be described with reference to FIG. 6 below, the tube clips are used to route flexible air hoses between the air fittings (like the air fitting 514) and the nozzles 140, and to prevent unnecessary tangling or abrasion of the air hoses as the nozzles 140 are repeatedly reconfigured.

Figure 6:
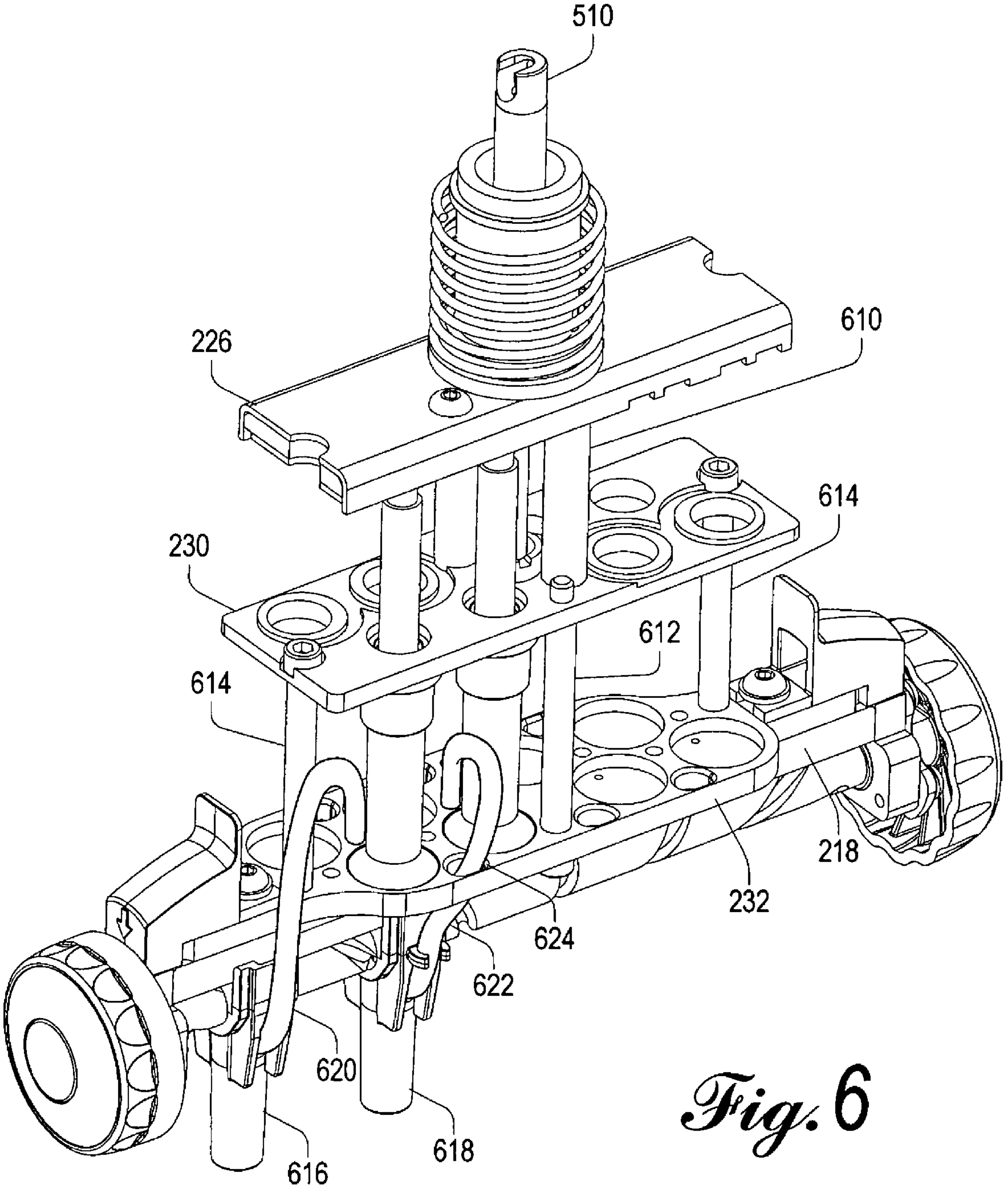
FIG. 6 is an isometric view of the interior of a liquid end with variable nozzle spacing according to an embodiment of the invention, with several components removed and flexible air hoses visible.

More operational details of a liquid end assembly 130 according to the invention are visible in FIG. 6, which omits several components of the liquid end assembly 130 for clarity. As noted above, the plunger shaft 510 receives input from the pipette body 120 and moves axially in response thereto. The plunger shaft is coupled to the piston plate 226, causing the piston plate 226 (and hence the pistons) to move in response to movement from the drive apparatus of the pipette 110.

The coupling nut 512 (FIG. 5) does not move, and is rigidly attached to the pipette body 120 which also serves to anchor two cylinder plate supports 610. As noted above, the cylinder plate 230 is fixed in position with respect to the liquid end assembly 130 and the pipette body 120, and the cylinder plate supports 610, which extend through openings in the piston plate 226, facilitate this.

It will be recalled that a plurality of cylinders are situated between the cylinder plate 230 and the manifold 232. However, as the accuracy and reliability of a pipette 110 according to the invention depends on the stability of the precise relative position between the cylinder plate 230 and the manifold 232, several stanchions are additionally provided. Two metal stanchions 612 near the center of the liquid end assembly 130 rigidly connect the cylinder plate 230 to the manifold 232. Two additional metal stanchions 614 at the lateral ends of the liquid end assembly 130 connect the cylinder plate to the manifold 232 and the rail 218, which is solidly anchored to the underside of the manifold 232.

FIG. 6 illustrates two nozzles. A first nozzle 616 is connected with a first flexible air hose 620 to the manifold 232 via one of the air fittings on the manifold 232. The first flexible air hose 620 is anchored within the first nozzle in a fluid-tight manner, such that the open end of the air hose 620 is in communication with an open end of the nozzle 616, without leaks. It will be noted that the first flexible air hose 620 is routed outside of the manifold and has sufficient slack for significant lateral movement of the nozzle 616.

A second nozzle 618 is connected with a second flexible air hose 622 to the manifold 232 via another of the air fittings on the manifold 232. This air hose 622 is routed to the manifold 232 via an aperture 624 in the manifold 232, and there is still sufficient slack for significant lateral movement of the nozzle 618, though the second nozzle 618 will travel less than the first nozzle 616. The aperture 624 (and other air hose apertures in the manifold 232) is configured to have smooth edges, thereby avoiding unnecessary abrasion or damage to the air hoses as the nozzles 140 are repeatedly reconfigured between narrow and wide positions.

As shown in FIG. 6 (and elsewhere herein), the nozzles 616 and 618 are configured for the LTS tip/shaft system commercialized by Rainin Instrument, LLC. It will be noted that other nozzle configurations and shapes may be employed within the scope of the present invention.

Figure 7:
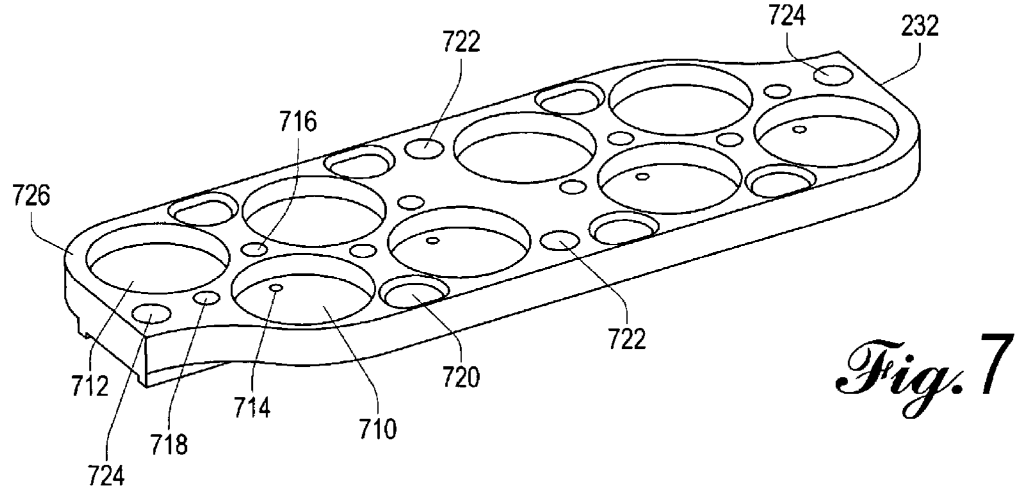
FIG. 7 is a top view of a manifold used in the liquid end illustrated in FIGS. 5 and 6.
Figure 8:
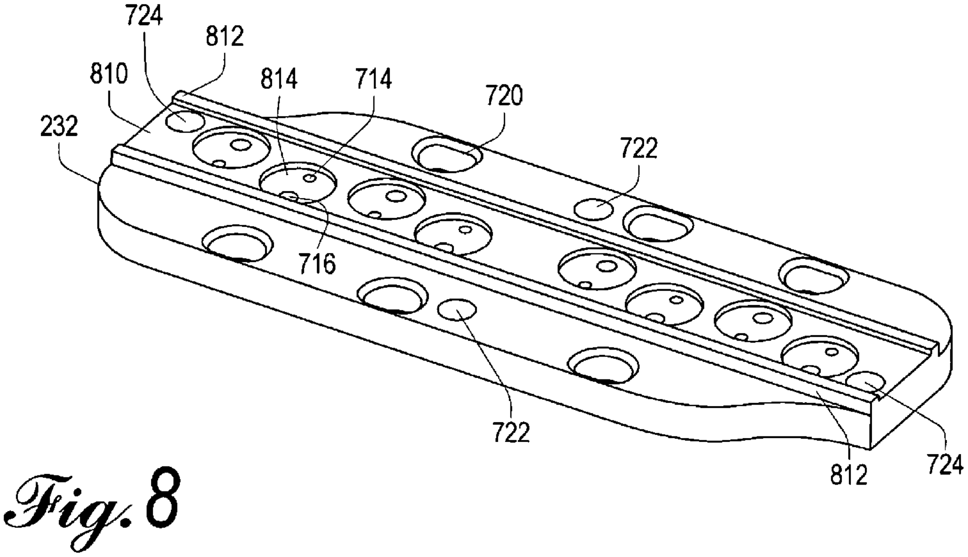
FIG. 8 is a bottom view of the manifold illustrated in FIG. 7.

The manifold 232 (which acts as such only in connection with the rail 218) is illustrated in further detail in FIGS. 7-8.

A top surface 726 of the manifold 232 is illustrated in FIG. 7. The top surface 726 bears a plurality of cylinder receptacles, one for each cylinder employed in a liquid end assembly 130 according to the invention. A first cylinder receptacle 710 is illustrated; it has a circular profile and a substantially flat bottom, with an inner diameter substantially equal to that of the outer diameter of a mating cylinder. A seal is maintained between the first cylinder receptacle 710 and the mating cylinder (as with all other receptacles and cylinders) by means of a flexible o-ring interposed between the two.

Similarly, a second cylinder receptacle 712 is illustrated; it has substantially equal dimensions to the first cylinder receptacle 710 but is positioned against an opposing edge of the manifold 232.

Neither the wall of the cylinder nor the o-ring blocks an air hole within each receptacle; an first exemplary air hole 714 is shown within the first cylinder receptacle. When the manifold 232 is tightly coupled to the rail 218, the air hole 714 is in communication with a first air fitting receptacle 716, which as described above, receives an air fitting 514. Accordingly, a cylinder within the first cylinder receptacle 710 of the manifold 232 can pass air through the air hole 714 to the corresponding air fitting 514. And similarly, a cylinder within the second cylinder receptacle 712 of the manifold 232 can pass air to another corresponding air fitting via a second air fitting receptacle 718. This structure is repeated for each of the eight cylinder receptacles (and eight cylinders) in the disclosed embodiment, although it should be noted that other configurations with six, twelve, or some other number of channels are equally possible.

As described above, apertures such as an aperture 720 are provided in the manifold 232 to permit air hoses to traverse from the bottom of the manifold 232 (where the nozzles 140 are located) to the top of the manifold 232 (where the air fittings are located), while avoiding substantial friction, abrasion, or binding.

The manifold 232 is further provided with first through-holes 722 for the stanchions 612 connecting the manifold 232 to the cylinder plate 230, and second through-holes 724 for the stanchions 614 connecting the cylinder plate 230 to both the manifold 232 and the rail 218.

As shown in FIG. 8, a bottom surface 810 of the manifold 232 defines a channel bounded by two raised ridges 812, between which the rail 218 fits. A plurality of air chambers is provided between the ridges 812; these air chambers are sealed with O-rings when the rail 218 is securely mounted to the manifold 232 via the stanchions 614. By way of illustration, a first air chamber 814 receives both the first air hole 714 within the first cylinder receptacle 710 and the first air fitting receptacle 716. The other air chambers are similarly configured, each connecting an air hole from a cylinder receptacle (on the top surface 726 of the manifold 232) to a corresponding air fitting receptacle.

To summarize, then, as each cylinder of the liquid end assembly 130 is sealed to the manifold 232 via an o-ring, and is further sealed to the cylinder plate 230 via an o-ring and a piston seal, and as the rail 218 is sealed to the bottom surface 810 of the manifold 232 via a plurality of o-rings to seal and isolate the air chambers, a plurality of fluid-tight air paths is created. As the pistons move uniformly up and down within the plurality of cylinders, they displace air within the cylinders, each of which is coupled to the manifold, and connects via an air hole to an air chamber and an air fitting. Each air fitting is in turn connected via a flexible air hose to a nozzle of the plurality of nozzles 140. Accordingly, each cylinder is coupled to a corresponding nozzle, and although the nozzles 140 may be adjusted and move laterally, the air hoses are flexible yet relatively inelastic, so the air column between each piston and its nozzle is substantially constant as the nozzle spacing varies. In the disclosed embodiment, the air hoses are made from TYGON R-3603 tubing from Saint-Gobain Performance Plastics, which is sufficiently flexible, inelastic, chemical-resistant, non-contaminating, and abrasion-resistant for use in connection with the present invention. However, it will be noted that other tubing materials may be used.

It should be noted that in various applications within the present invention, o-rings are used to seal between components. Adhesives may be used in place of or in addition to o-rings, but for ease of maintenance and component replacement, compression fittings with o-rings provide advantages.

Figure 9:
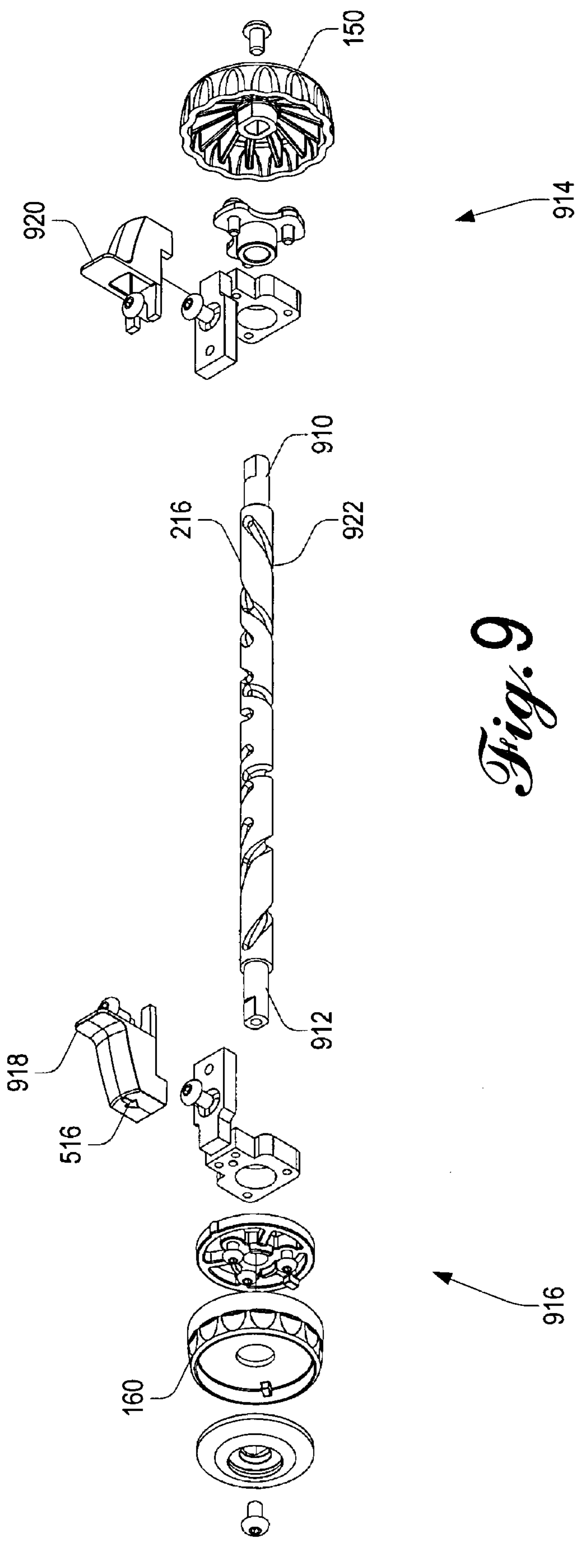
FIG. 9 is an exploded view of key components of a nozzle spacing adjustment mechanism according to an embodiment of the invention.

FIG. 9 sets forth an exploded view of key components of a nozzle spacing adjustment portion of a liquid end assembly 130 according to an embodiment of the invention. The illustrated portion is designed around a grooved cam 216 with a first keyed end 910 and a second keyed end 912.

At one lateral end of the liquid end assembly 130 adjacent to the first keyed end 910 of the cam 216, a nozzle spacing adjustment mechanism 914 includes the spacing adjustment knob 150.

At the other lateral end of the liquid end assembly 130 adjacent to the second keyed end 912 of the cam 216, a spacing stop mechanism 916 includes the stop knob 160. As discussed above, a portion 918 of the housing 220 affixed to the spacing stop mechanism 916 may be provided with an arrow 516 that references markings 517 on the stop knob 160. A counterpart housing portion 920 may be affixed to the nozzle spacing adjustment mechanism 914.

Operation of the nozzle spacing adjustment mechanism 914 will be described below with reference to FIGS. 11-12. Operation of the spacing stop mechanism 916 will be described below with reference to FIGS. 13-14.

FIG. 10 depicts how a nozzle is coupled to the cam 216. The nozzle comprises two pieces: a nozzle bottom piece 1010 and a nozzle top piece 1012; the two pieces snap together around the cam 216.

The nozzle bottom piece 1010 includes a window 1014 through which an air hose (such as the air hose 620 or 622) may be routed to connect to a nozzle opening 1024. The air hose makes a fluid-tight seal with an interior surface of the nozzle bottom piece 1010. As described above, tips are mounted to the bottom piece 1010, and air displacement occurs through the opening 1024.

The nozzle top piece 1012 has an internal ball-shaped projection 1016, dimensioned to fit within a groove on the cam 216. When the nozzle is assembled, rotating the cam 216 will cause the projection 1016 to track the helical groove and move along the cam 216. In one possible alternative embodiment, the ball-shaped projection 1016 may be replaced with a receptacle and a separate ball or other independent piece, which may be of a preferred size, shape, and material to optimally track the groove.

In the disclosed embodiment, the cam 216 has a plurality of helical grooves equal in number to the nozzles 140. The grooves are symmetric about a centerpoint of the cam. As illustrated, the grooves begin 9 mm apart, which permits the nozzles 140 to be 9 mm apart in their narrowest configuration. The grooves nearest the centerpoint have a constant pitch adequate to move the innermost nozzles to their widest position. In other words, in the disclosed embodiment where spacings from 9 mm to 14.5 mm are possible, the grooves closest to the centerpoint are each 4.5 mm away from the centerpoint. These grooves have a pitch allowing the nozzles to move to 7.25 mm over the course of the groove, which covers a partial rotation of the cam 216. At their narrowest, the innermost grooves are each 4.5 mm from the centerpoint and hence 9 mm apart, and at their widest, the innermost grooves are each 7.25 mm from the centerpoint and hence 14.5 mm apart.

Moving away from the centerpoint, each successive groove has a pitch that is an integer multiple of the innermost groove's pitch. For example, the second groove's pitch is twice that of the innermost groove, and the third groove's pitch is three times that of the innermost groove. This arrangement imposes uniform spacing among the nozzles 140 as the nozzle spacing cam 216 is rotated.

The nozzle is prevented from rotating about the cam 216 by a first upward-projecting guide 1018 and a second upward-projecting guide 1020 on the nozzle bottom piece 1010. These guides 1018 and 1020 track along the smooth sides of the rail 218, while an upper surface 1022 of the nozzle top piece 1012 tracks along a smooth bottom surface of the rail 218. The upper surface 1022 and the guides 1018 and 1020 of the nozzle form a "U" shape that engages three sides of the rail 218 with little play or slack.

Although the described cam 216 bears grooves that are symmetric about a centerpoint, it is also possible to configure the grooves in an asymmetric fashion. In one possible alternative, one nozzle remains stationary while the others track grooves and remain proportionately equidistant from each other. Moreover, although a grooved cam is used in the disclosed embodiment, that configuration is not the only possibility. It should be noted that a lobed cam may be substituted for the grooved cam 216, provided the nozzles 140 are configured appropriately to track a helical raised lobe rather than a groove. Other embodiments are also possible.

In the disclosed embodiment, the nozzle bottom piece 1010 is molded or machined from KYNAR Polyvinylidene Difluoride (PVDF) from Arkema Inc., while the nozzle top piece 1012 is molded or machined from DELRIN acetal from DuPont. It should be noted that other materials having the desired physical (strength, rigidity, and lubricity, for example) and chemical (e.g. non-reactivity) characteristics may be substituted.

FIGS. 11-12 set forth exploded views of the spacing adjustment mechanism 914 of a liquid end assembly 130 according to the invention.

In FIG. 11, a spacing adjustment knob bracket 1110 attaches rigidly to the rail 218 by way of a screw fastener 1112. A bearing sleeve 1114 defining an opening 1116 is coupled to the bracket 1110 also by screw fasteners 1118. In the disclosed embodiment, the sleeve is fabricated from DELRIN, as it provides advantageous lubricity and permits the cam 216 to rotate easily within the opening 1116. The spacing adjustment knob 150 attaches to the first keyed end 910 (FIG. 9) of the cam 216 via a screw fastener 1120; the spacing adjustment knob 150 has a keyed opening to receive the keyed end 910 of the cam 216, so the cam 216 rotates with the knob 150. Optionally, a printed insert 1124 and a clear plastic lens 1126 may snap into the spacing adjustment knob 150 to cover the screw fastener 1120. FIG. 12 illustrates the same components, but the alternative view shows that the spacing adjustment knob 150 includes reinforcement ribs 1210 to provide structural rigidity; there are, of course, other ways of accomplishing this that will be recognized by a mechanical engineer of skill.

FIGS. 13-14 set forth exploded views of the spacing stop mechanism 916 of a liquid end assembly 130 according to the invention.

As shown in FIG. 13, a stop knob bracket 1310 is affixed rigidly to the rail by a screw fastener 1312. The optional housing piece 918 is affixed to the stop knob bracket also via a screw fastener 1316.

A detent ring 1318 is affixed to the stop knob bracket 1310 by multiple screw fasteners 1324, assuring the detent ring 1318 does not rotate with respect to the bracket 1310. An radial external surface of the detent ring 1318 bears a detent bump 1320, and a face of the detent ring 1318 bears a detent bumper 1322.

The stop knob 160, which includes a rotating stop ledge 1326 (described below) rides over the detent ring 1318, and is retained by a stop knob endcap 1328, which attaches to the second keyed end 912 of the cam 216 by a screw fastener 1330, which may also be covered by a printed insert 1332 and a clear lens 1334.

The rear of the spacing stop mechanism 916 illustrated in FIG. 14 is somewhat more illustrative. The detent bump 1320 on the detent ring 1318 engages with a series of depressions around a radial inner surface of the stop knob 160. It will be noted that the stop knob 160 has a round central opening 1414 and is free to rotate without engaging the cam 216. However, as will be illustrated in connection with FIGS. 15-16 below, the stop knob 160 has an inner rotation bumper that limits the range of rotation of the stop knob 160 in connection with the detent bumper 1322 on the detent ring 1318. The detent bumper 1322 and the inner rotation bumper of the stop knob 160 together prevent the stop knob 160 from overrotating.

The stop knob endcap 1328 includes an endcap stop tab 1410 on its back face and a keyed opening to receive the second keyed end 912 of the cam 216. Accordingly, the endcap 1328 rotates with the cam 216 until the stop tab 1410 engages the stop ledge 1326 on the stop knob 160. Because the stop ledge 1326 moves with the stop knob 160 (subject to the detent depressions), the position of the stop ledge 1326 can be moved to any desired angular location. The endcap 1328 is free to move with the cam 216 between a position representing a most-retracted position of the nozzles 140 on the cam 216 and the position of the stop ledge 1326, at which point the endcap stop tab 1410 is obstructed by the stop ledge 1326.

If desired, and if the detent bump 1320 and the stop knob 160 are configured to allow a relatively light force to move from detent to detent, the user will encounter resistance when turning the spacing adjustment knob 150 to a point where the stop ledge 1326 is encountered. Applying additional force to the spacing adjustment knob 150 will cause the endcap stop tab 1410 to push against the stop ledge 1326 on the stop knob, and if the force is sufficient to overcome the detent, the stop will be pushed out of the way. This desirable action is accompanied by a definite and noticeable tactile “clicking” sensation and sound as the stop knob 160 is pushed. This same sound and sensation is present when manually adjusting the stop knob 160 over the detents.

Figure 15:
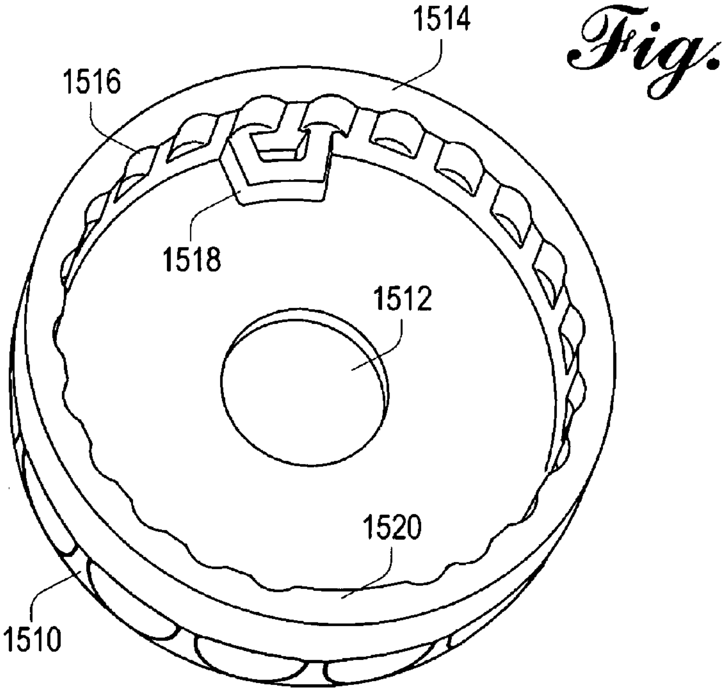
FIG. 15 is a view of one embodiment of a stop knob used in a six-channel adjustable-spacing liquid end according to the invention.
Figure 16:
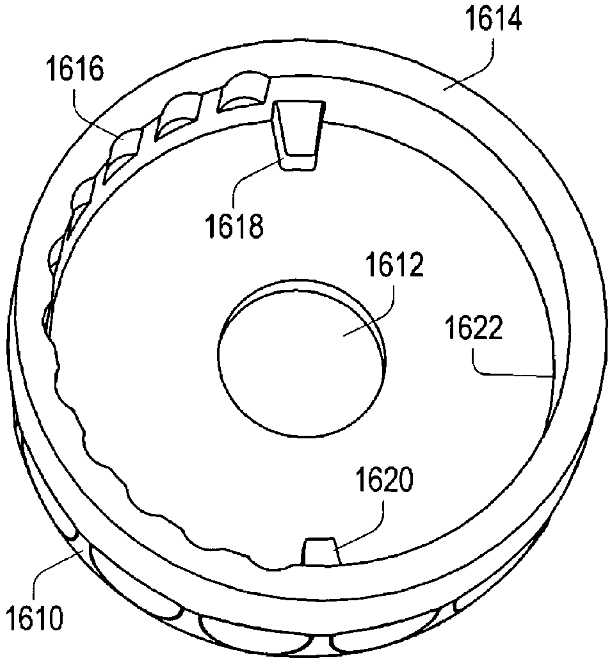
FIG. 16 is a view of one embodiment of a stop knob used in an eight-channel adjustable-spacing liquid end according to the invention.

Two versions of the stop knob 160 are illustrated in FIGS. 15 and 16.

FIG. 15 illustrates a stop knob 1510 usable in a six-channel adjustable-spacing liquid end assembly 130 according to the invention. Because only six channels are used, a wider range of adjustability is possible (from 9 mm at the narrowest setting to over 23 mm at the widest), and accordingly, the stop knob 1510 should be similarly adjustable over a wide range. Accordingly, in addition to the unkeyed opening 1512, a rim 1514 of the stop knob 1510 includes a plurality of detent depressions 1516 over a substantial portion of the circumference of the rim 1514. However, a stop knob rotation bumper 1518 is set on an inner face of the knob 1510, and a portion 1520 of the rim 1514 diametrically across from the rotation bumper is free of detents. The six-channel version of the stop knob 1510 is free to rotate except to the extent blocked by the rotation bumper 1518 and its interaction with the detent bumper 1322 of the detent ring 1318, nearly a full revolution.

FIG. 16 illustrates a stop knob 1610 usable in an eight-channel adjustable-spacing liquid end assembly 130 according to the invention. Because eight channels are used, in the disclosed embodiment the stop may be adjusted from about 9 mm to about 14.5 mm. Consequently, in addition to the unkeyed opening 1612, a rim 1614 of the stop knob 1610 includes a plurality of detent depressions 1616 over a portion of the circumference of the rim 1614. There are two stop knob rotation bumpers 1618 and 1620; the detent bumper 1322 of the detent ring 1318 may range only between the bumpers 1618 and 1620. Accordingly, the portion 1622 of the rim 1614 opposite the detent depressions 1616 is smooth and free of detents.

It will be noticed that alternative embodiments of both the spacing adjustment mechanism 914 and the spacing stop mechanism 916 are possible. In particular, it is possible to place both the spacing adjustment knob 150 and the stop knob 160 on the same end of the liquid end assembly. Like the spacing adjustment knob 150, the stop knob endcap 1328 disclosed above rotates with the cam 216, so it would be possible to eliminate the spacing adjustment knob 150 on the first keyed end 910 of the cam 216, and supplement the stop knob endcap 1328 with a replacement adjustment knob.

Similarly, in the disclosed embodiment, soft detents are used to lock the stop knob 160 in position and avoid inadvertent adjustment. Alternative embodiments are possible in which the detent (or a frictional collet lock) is disengaged when a spring-loaded stop knob 160 is pulled out, or a push-button may be used to disengage a ratchet locking the stop knob in place. Alternatively, the stop mechanism 916 may be implemented as a sliding stop along a side of the housing 220. Numerous other implementations are possible and are deemed to be within the scope of the present invention.

In the disclosed embodiment, the nozzles 140 move along a cam 216 and rail 218, while the pistons and cylinders remain in place. Alternative embodiments may allow the pistons and cylinders to move with the nozzles; such embodiments may be able to eliminate the function of the manifold 232 and the air hoses connecting the manifold 232 to the nozzles 240. This configuration is considered to be within the scope of the invention, but it is expected that it would be less stable and accurate, and hence the disclosed embodiment has distinct advantages.

It should be observed that while the foregoing detailed description of various embodiments of the present invention is set forth in some detail, the invention is not limited to those details and a handheld pipette liquid end with adjustable nozzle spacing made according to the invention can differ from the disclosed embodiments in numerous ways. In particular, it will be appreciated that embodiments of the present invention may be employed in many different fluid-handling applications. It should be noted that functional distinctions are made above for purposes of explanation and clarity; structural distinctions in a system or method according to the invention may not be drawn along the same boundaries. Hence, the appropriate scope hereof is deemed to be in accordance with the claims as set forth below.

What is claimed is:

1. A liquid-end assembly for a handheld multichannel pipette, the liquid-end assembly comprising:

a housing for the liquid-end assembly, wherein the housing is configured to receive a plunger shaft connectable to a drive mechanism of the pipette for axial movement of the plunger shaft in the housing;

a plurality of cylinders mounted within the housing;

a plurality of air displacement pistons each mounted for axial movement in and through an open upper end of one of the cylinders in response to axial movement of the shaft in the housing;

a plurality of nozzles, each connected to a respective one of the plurality of cylinders, and each with a lower open end extending from a bottom wall of the housing; and a spacing adjustment mechanism configured to be manipulated by a user and to displace at least one nozzle from another relative to rotation of an adjustment component, the adjustment component comprising a rotatable nozzle spacing cam having a plurality of helical grooves.

2. The liquid-end assembly for a handheld multichannel pipette of claim 1, wherein:

The nozzle spacing cam has a centerpoint;

the grooves are substantially symmetric about the centerpoint;

each subsequent groove on either side of the centerpoint increases in pitch; and each nozzle of the plurality of nozzles corresponds to a groove of the plurality of grooves on the nozzle spacing cam.

3. The liquid-end assembly for a handheld multichannel pipette of claim 1, wherein each nozzle of the plurality of nozzles tracks the corresponding groove on the nozzle spacing cam as the nozzle spacing cam rotates.

4. The liquid-end assembly for a handheld multichannel pipette of claim 3, wherein each nozzle of the plurality of nozzles is restricted from rotating with the nozzle spacing cam by engagement with a nozzle rail parallel to the nozzle spacing cam.

5. The liquid-end assembly for a handheld multichannel pipette of claim 4, wherein rotation of the nozzle spacing cam causes each nozzle of the plurality of nozzles to traverse axially along the nozzle spacing cam and to slide along the nozzle rail.

6. The liquid-end assembly for a handheld multichannel pipette of claim 1, wherein:

one nozzle of the plurality of nozzles is stationary;

starting from an end of the spacing adjustment cam adjacent to the stationary nozzle, each successive groove on the spacing adjustment cam increases in pitch; and each remaining nozzle of the plurality of nozzles corresponds to a groove of the plurality of grooves on the nozzle spacing cam.

7. The liquid-end assembly for a handheld multichannel pipette of claim 6, wherein each remaining nozzle of the plurality of nozzles tracks the corresponding groove on the nozzle spacing cam as the nozzle spacing cam rotates.

8. The liquid-end assembly for a handheld multichannel pipette of claim 7, wherein each remaining nozzle of the plurality of nozzles is restricted from rotating with the nozzle spacing cam by engagement with a nozzle rail parallel to the nozzle spacing cam.

9. The liquid-end assembly for a handheld multichannel pipette of claim 8, wherein rotation of the nozzle spacing cam causes each remaining nozzle of the plurality of nozzles to traverse axially along the nozzle spacing cam and to slide along the nozzle rail.

10. The liquid-end assembly for a handheld multichannel pipette of claim 1, wherein the spacing adjustment mechanism further includes a spacing adjustment knob, and wherein the nozzle spacing cam is coupled to the spacing adjustment knob.

11. The liquid-end assembly for a handheld multichannel pipette of claim 1, wherein the pipette further comprises a stop adjustment mechanism configurable by a user to set a maximum nozzle spacing.

12. The liquid-end assembly for a handheld multichannel pipette of claim 11, wherein the stop adjustment mechanism comprises a stop knob operative to set an angular position of a stop ledge corresponding to a desired maximum nozzle spacing.

13. The liquid-end assembly for a handheld multichannel pipette of claim 12, wherein the spacing adjustment mechanism comprises a stop component coupled to rotate with the adjustment component, and wherein the stop component carries a stop tab positioned to strike the stop ledge of the stop knob and to restrict the rotation of the adjustment component when a spacing of the nozzles has reached the desired maximum nozzle spacing.

14. The liquid-end assembly for a handheld multichannel pipette of claim 1, wherein the spacing adjustment mechanism is configured to maintain a uniform spacing between adjacent pairs of the plurality of nozzles.

15. The liquid-end assembly for a handheld multichannel pipette of claim 1, wherein each of the plurality of nozzles is configured to receive a disposable pipette tip.

16. The liquid-end assembly for a handheld multichannel pipette of claim 15, wherein the liquid end assembly includes a plurality of fluid-tight pathways between each of the plurality of cylinders and a corresponding tip coupled to a corresponding nozzle.

17. The liquid-end assembly for a handheld multichannel pipette of claim 16, wherein movement of a piston within a cylinder of the plurality of cylinders causes a corresponding movement of an air column between the piston and the lower open end of the corresponding nozzle.

18. The liquid-end assembly for a handheld multichannel pipette of claim 1, wherein the cylinders have a fixed spacing not responsive to an actuation of the adjustment component, and wherein the liquid end assembly further comprises a plurality of flexible hoses coupling each cylinder of the plurality of cylinders to a corresponding nozzle.

19. The liquid-end assembly for a handheld multichannel pipette of claim 18, further comprising a manifold coupled to the plurality of cylinders and coupling each of the cylinders to one of the plurality of flexible hoses.

20. The liquid-end assembly for a handheld multichannel pipette of claim 1, wherein at least one cylinder of the plurality of cylinders moves with a corresponding nozzle of the plurality of nozzles when the adjustment mechanism is manipulated.

* * * * *